United States Patent [19]

Watanabe et al.

[11] Patent Number: 5,076,226
[45] Date of Patent: Dec. 31, 1991

[54] INTERNAL COMBUSTION ENGINE PISTON

[75] Inventors: Hiroaki Watanabe; Naohiro Iwaya; Tatsuyuki Matsuya, all of Kanagawa, Japan

[73] Assignee: Atsugi Unisia Corporation, Kanagawa, Japan

[21] Appl. No.: 659,909

[22] Filed: Feb. 25, 1991

[30] Foreign Application Priority Data

Feb. 27, 1990 [JP] Japan ................................ 2-19227[U]

[51] Int. Cl.⁵ .......................... F02M 11/00; F02F 3/00
[52] U.S. Cl. .................................. 123/193 P.; 92/158; 92/159
[58] Field of Search ......... 123/193 P, 193 CP, 196 R; 92/158, 159; 184/104.2

[56] References Cited

U.S. PATENT DOCUMENTS

| 1,760,122 | 5/1930 | Drevitson | 92/158 |
| 4,599,935 | 7/1986 | Ellerman et al. | 92/159 |
| 4,752,995 | 6/1988 | Collyear et al. | 123/193 P |
| 4,809,591 | 3/1989 | Rhodes et al. | 123/193 P |
| 4,903,580 | 2/1990 | Bruni | 123/193 P |

FOREIGN PATENT DOCUMENTS 60-111047  6/1985  Japan .

Primary Examiner—Raymond A. Nelli
Assistant Examiner—M. Macy
Attorney, Agent, or Firm—Ronald P. Kananen

[57] ABSTRACT

In order to ensure an adequate supply of oil onto the thrust surfaces of a reciprocating type internal combustion engine piston, recesses are formed in the skirt proximate each thrust surface. The boundary defined between the surface of the skirt and the recess is defined by a rounded surface which smoothly merges the recess with the surface of the skirt, eliminates sharp edges, and permits oil to flow uninhibited out of the recess onto the thrust surfaces.

6 Claims, 9 Drawing Sheets

INTERNAL COMBUSTION ENGINE PISTON

BACKGROUND OF THE INVENTION

1. Field of the Invention

The present invention relates generally to a piston for a reciprocating type internal combustion engine and more specifically to a piston which features a construction which improves the lubrication of the thrust surfaces of the same.

2. Description of the Prior Art

JP-A-60-111047 discloses a piston of the nature shown in FIGS. 14 and 15. In this arrangement the piston 1 has a head section 2 which is formed with piston ring grooves 3a, 3b and 3c; a curved surface skirt section 4 and piston bosses 5, 5. The construction further includes thrust surfaces 7 which are defined on the outer periphery of the piston surface and which are adapted to engage the cylinder bore wall and guide the piston as it ascends to and descends from top dead center (TDC).

The skirt 4 is formed with a first crecent-shaped recess 8 which merges in part with the lower of the three piston ring grooves 3c and which is located immediately above the thrust surface 7, and a second essentially inverted U-shaped recess 9 in the lower portion of the skirt section 4.

The first recess 8 and the strip-like surface 10 of the second recess 9 are respectively formed at predetermined angles as will be appreciated from FIGS. 14 and 15. As the piston reciprocates up and down, lubricating oil tends to be retained in the first and second recesses 8, 9 in a manner which prevents the same from flying off and which enables its use to form a friction reducing oil film between the cylinder bore wall 6 and the outer periphery of the skirt 4.

However, this prior art arrangement has suffered from the drawback that, as the first recess 8 and the strip-like surface 10 are arranged at predetermined angles, the upper boundary 11 of the second recess 9 and the lower limit 12 of the first recess 8 define discrete stepped edges which inhibit the lubricating oil which is retained in the two recesses 8, 9 from being adequately supplied onto the thrust surfaces, and thus induce the situation wherein the oil film on the thrust surface breaks and increases the frictional sliding resistance. As a result, the piston is subject to increased heating. Further, as the recesses 8 and 9 reduce the amount of surface area of the thrust surface 7 which actually contacts the cylinder bore wall 6, the amount of force per unit area increases and in the event that an adequate amount of lubricant is not supplied, the tendency for overheating to occur increases.

Further, during reciprocation of the piston 1 in the cylinder bore, considerable side forces are applied, whereby the edges defined by the boundaries 11, 12 are brought into strong contact with the cylinder bore wall 6 and induce the generation of a relatively large amount of frictional resistance. This enhances the tendency for the piston to be subject to overheating.

SUMMARY OF THE INVENTION

It is an object of the present invention to provide a piston construction which improves the lubrication between the piston and the cylinder bore wall, particularly the thrust surface/bore wall interface, and which therefore reduces the amount of frictional resistance and heating which is encountered during piston reciprocation.

In brief, the above object is achieved by an arrangement wherein recesses are formed in the skirt proximate each thrust surface. The boundary defined between the surface of the skirt and the recess is defined by a rounded surface which smoothly merges the recess with the surface of the skirt, eliminates sharp edges, and permits oil to flow uninhibited out of the recess onto the thrust surfaces.

More specifically, a first aspect of the present invention is provided in a piston which features: a head portion; a thrust surface; a skirt which extends downwardly from the thrust surface, a shallow recess formed in the skirt portion in which oil can be collected during reciprocation of the piston in a cylinder bore; and means defining a rounded surface at the boundary defined between the recess and the surface in which it is formed, for smoothly merging the recess with the surface in which it is formed, for eliminating the formation of discrete edges, and for permitting oil in the recess to readily flow onto the thrust surface.

A second aspect of the present invention is provided in a piston which features: a thrust surface; a skirt; means defining a recess in the skirt in which oil can be collected during reciprocation of the piston in a cylinder bore; and surface means which extends along a boundary defined between the recess and the surface in which the recess is formed, said surface means smoothly merging the recess and the surface in which the recess is formed, eliminating discrete edges, and permitting oil to flow from the recess onto the thrust surface.

DETAILED DESCRIPTION OF THE PREFERRED EMBODIMENTS

Figure 1:
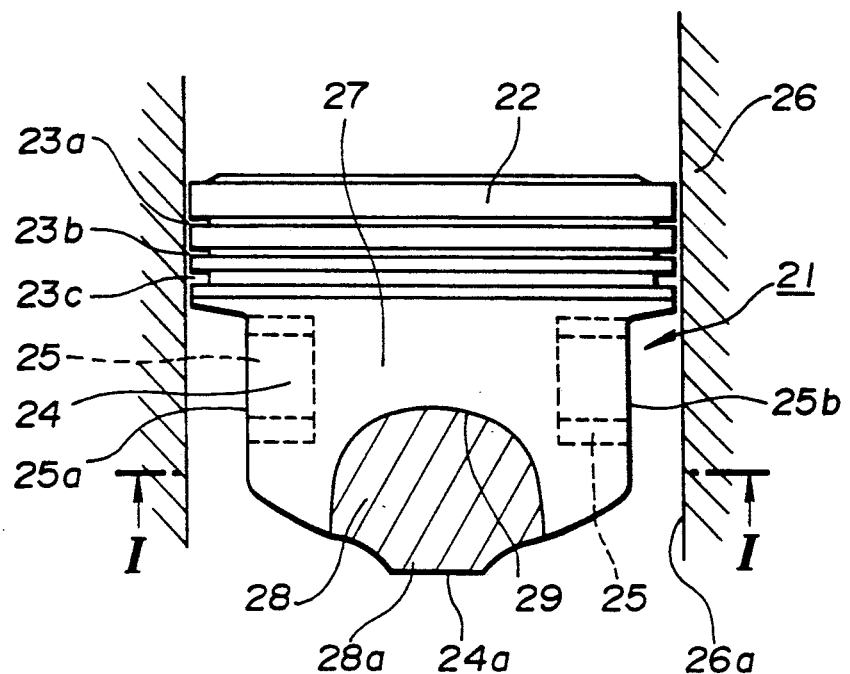
FIG. 1 is a front elevation showing a first embodiment of the present invention.
Figure 2:
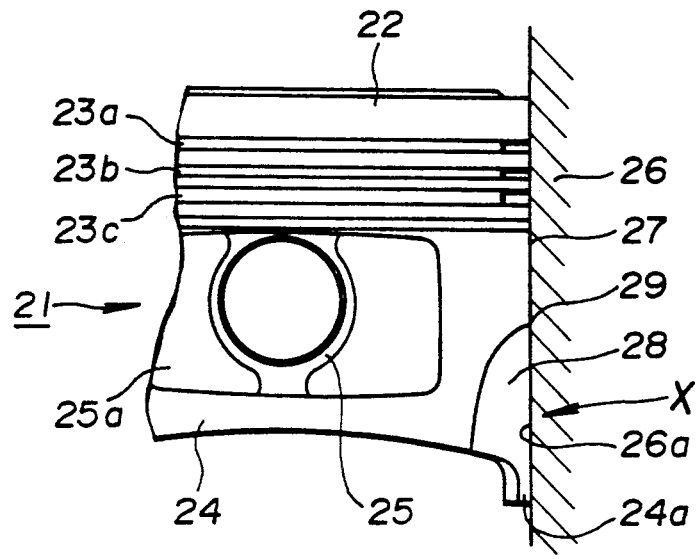
FIG. 2 is a side elevation of the piston shown in FIG. 1.

FIG. 1 shows a first embodiment of the present invention. In this arrangement a piston 21 includes a head portion 22 in which three piston ring receiving grooves 23a–23c are formed. The piston 21 further includes an integral skirt portion 24. As shown in FIGS. 1 and 2, this skirt portion 24 is formed with piston bosses 25, 25 which have side surfaces 25a, 25b. The piston is further formed with cylindrically curved thrust surfaces 27, 27 which are arranged to engage the bore wall 26a of the cylinder bore 26 as the piston 21 reciprocates up and down therein.

Figure 3:
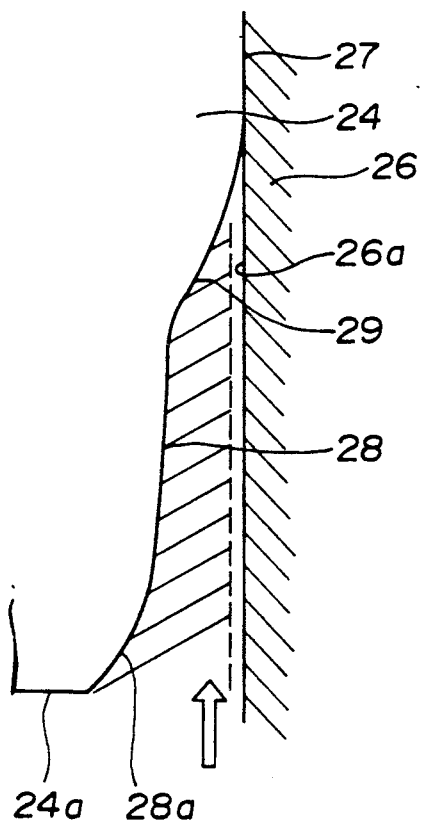
FIG. 3 is an enlargement of the portion indicted by the arrow x in FIG. 2.
Figure 4:
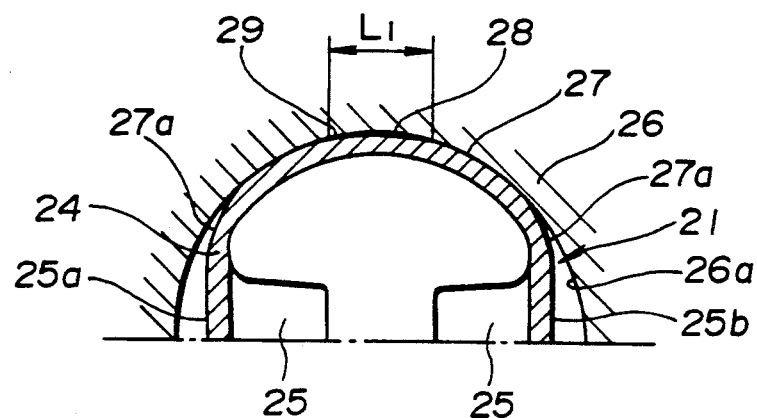
FIGS. 4 and 5 are sectional views taken along section line I—I of FIG. 1 under different side force loads.
Figure 5:
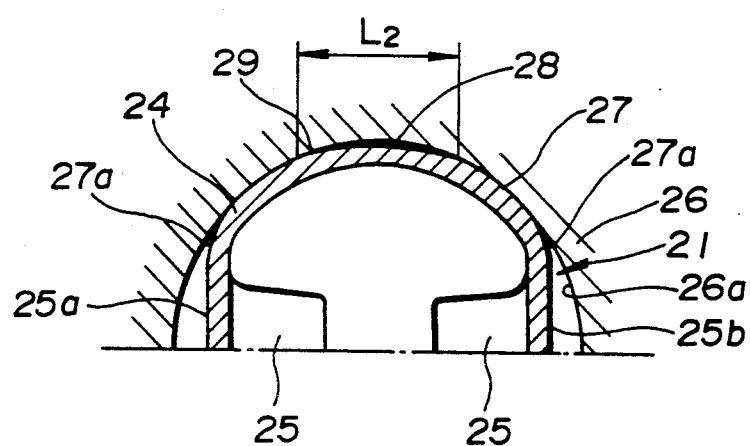

These thrust surfaces 27 are, as shown in FIGS. 4 and 5, located diametrically opposite one another and in a manner to be angularly displaced 90° with respect to the piston bosses 25. In this embodiment, the thrust surfaces 27 are formed with essentially semi-circularly shaped recesses 28 which extend up from the lower edge 24a of the skirt 24 and which have symmetrical halves formed on either side of the thrust surface center line. The lower portion 28a of each recess is, as shown in FIG. 3, arranged to curve smoothly inward. The full perimeters or boundaries of the recesses are formed in a manner to define a curved "barrel-like" surface 29 which blends smoothly into the skirt surface and which eliminates the formation of sharp edges. In other words, the "barrel-like" rounded surface 29 of the recesses 28 permits the latter to merge steplessly into the thrust surfaces 27.

Accordingly, with this embodiment, as the piston descends the inwardly curved portions 28a of the recesses 28 prevent the lubricating oil on the bore wall 26a from being swept or scraped away and permits the same to be collected in the recesses 28. The oil which enters the recess 28 can be flow up over the curved barrel-like surfaces 29 and be supplied in between the thrust surfaces 27 and the bore wall 26a. In this manner, an adequate amount of lubricating oil is introduced between the thrust surfaces 27 and the bore wall 26a and prevents the oil film breakage which plagues the prior art. As a result the frictional resistance is reduced.

As shown in FIG. 4, when the side forces which the piston is subject to during reciprocation, are such as to strongly urge the thrust surfaces 27 into contact with the bore wall 26a, the curved barrel-like surface 29 distorts a little and the external peripheral edge of the surface thereof assumes essentially the same clearance from the bore wall 26a as the thrust surface 27. Under these conditions, the width of the recess 28 taken in the peripheral direction reduces from L2 to L1 (L2 denoting the width which occurs in the absence of side loading forces). However, this is still sufficient to ensure that oil is supplied into the interface defined between the thrust surface 27 and the bore wall 26a and that oil film breakage does not occur.

Accordingly, due to the provision of the smooth curved surfaces 29, the edge problem which is encountered with the prior art is eliminated and the tendency for relatively large amounts of frictional resistance to be generated is obviated.

Figure 6:
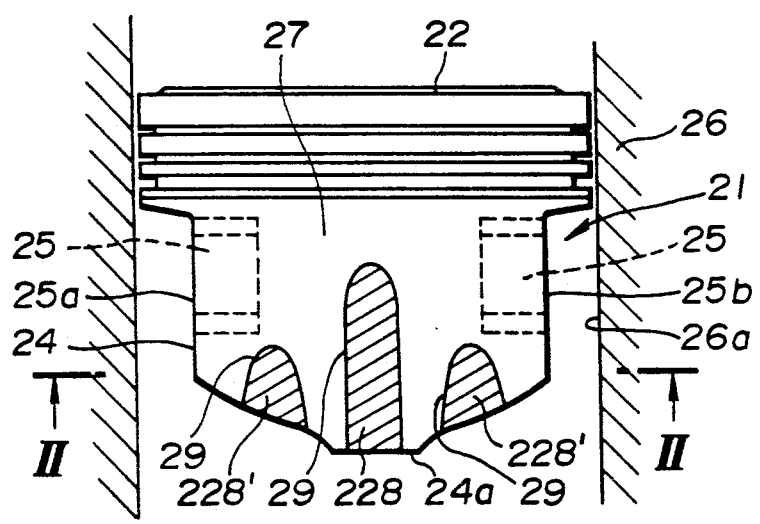
FIG. 6 is a front elevation of a second embodiment of the present invention.
Figure 7:
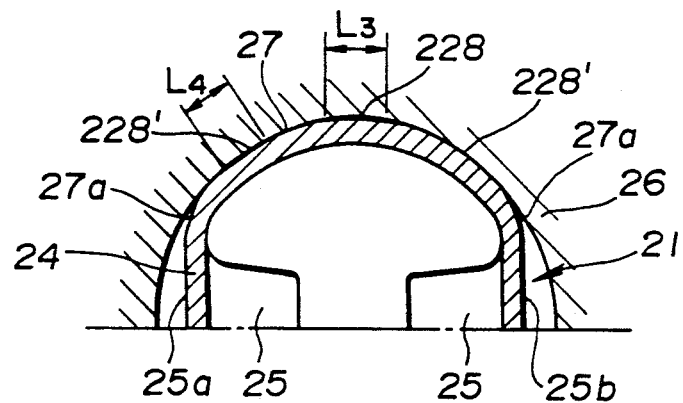
FIGS. 7 and 8 are sectional views taken along section line II—II of FIG. 6.
Figure 8:
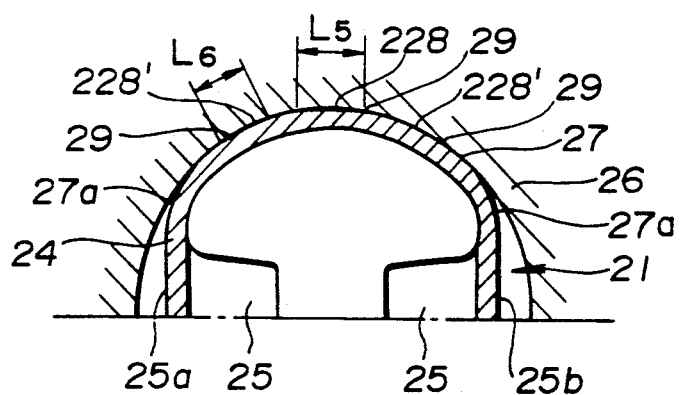

FIGS. 6 to 8 show a second embodiment of the present invention. In this embodiment three relatively long and narrow recesses 228, 228' and 228' are formed per thrust surface 27. As shown in FIG. 6 the central recess 228 extends upward from the lower edge 24a of the skirt to a level proximate the upper level of the thrust surface 27. On the other hand, the recesses 228' formed on either side of the central recess 228 are shorter and are about ½ as long as the recess 228. As shown, these side recesses also extend up from the lower edge 24a of the piston skirt. Each of the recesses is formed with curved barrel-like boundary surfaces 29 in essentially the same manner as the recess 28 of the first embodiment.

This embodiment functions in essentially the same manner as the first one and is such that when a side force is applied to the piston, the curved surfaces 29 distort slightly allowing the peripheral widths of the recess 228, 228', 228' to change from L5 and L6 to L3 and L4 as indicated in FIGS. 7 and 8. However, even when the widths are diminished in such a manner, the ability to supply adequate amounts of oil between the thrust and bore wall surfaces is maintained.

As a variant of this embodiment, it is possible to elongate the side recesses 228' to approximate the length of the central recess 228, if so desired.

Figure 9:
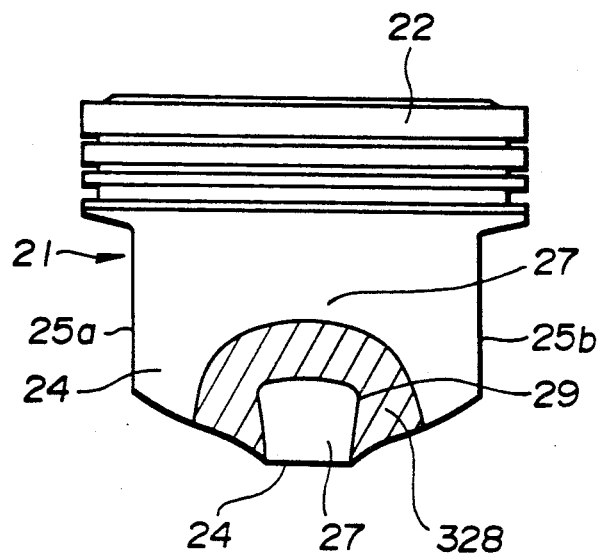
FIGS. 9–13 are respectively front elevations of third to seventh embodiments of the present invention.

FIG. 9 shows a third embodiment of the present invention. In this arrangement, the recess 328 is essentially semi-circular and an island-like projection 27b is provided approximately in the center of the recess 328. This projection forms part of the thrust surface 29. The boundaries 29, defined between the recess 328 and the projection 27b and the thrust surfaces 27, 27a are rounded in the same manner as the previous embodiments so as to smoothly merge the recess 328 with the surrounding peripheral surfaces and so that delivery of oil contained in the recess 328 onto the thrust surfaces 27, 27a is not hampered.

Figure 10:
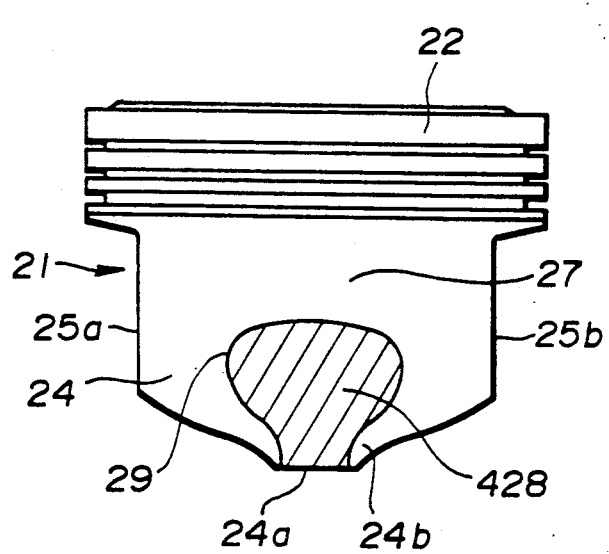

FIG. 10 shows a fourth embodiment of the present invention. In this embodiment, the recess 428 is essentially petal-shaped wherein the width of the recess is located proximate a portion 24b of the skirt located immediately above the lower edge 24a of the skirt 24.

Figure 11:
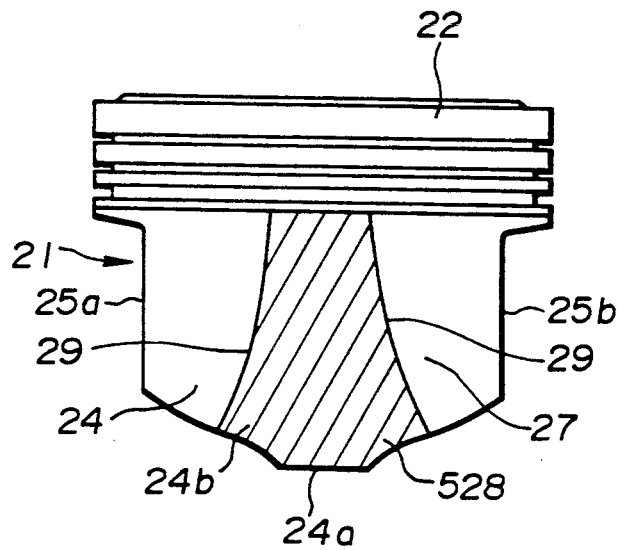

FIG. 11 shows a fifth embodiment of the present invention. In this arrangement, the recess 528 extends all the way from the lower skirt edge 24a to a portion of the head 22 proximate the lower of the three piston ring grooves and thus pass through the thrust surface 27. The widest portion of this recess 528 is located at the portion 24b of the skirt located immediately above the lower edge of the skirt 24a. From this widest portion, the recess curves inwardly.

Figure 12:
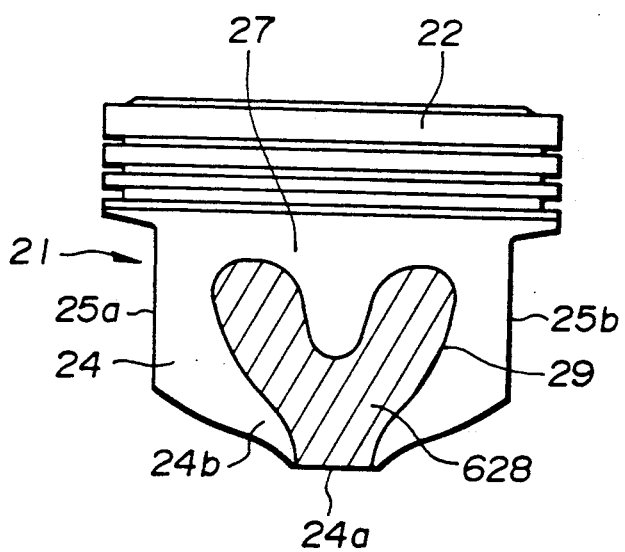

FIG. 12 shows a sixth embodiment of the present invention. In this arrangement the recess 628 is bifurcated in a manner which resembles "rabbit ears". The lower portion of the recess opens onto the lower edge 24a of the skirt 24.

Figure 13:
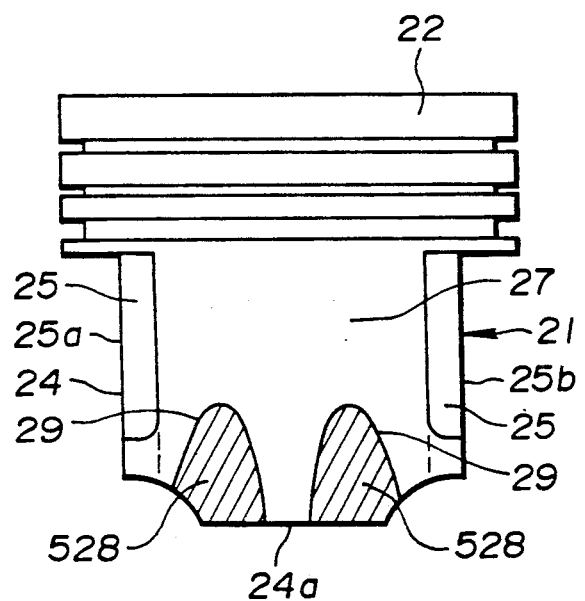
Figure 14:
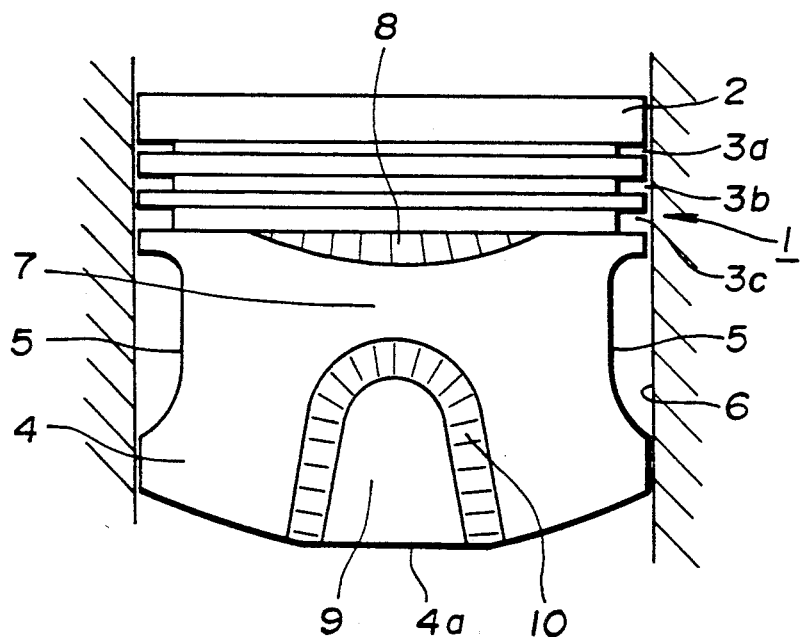
FIG. 14 is a front elevation of the prior art piston discussed in the opening paragraphs of the present invention.
Figure 15:
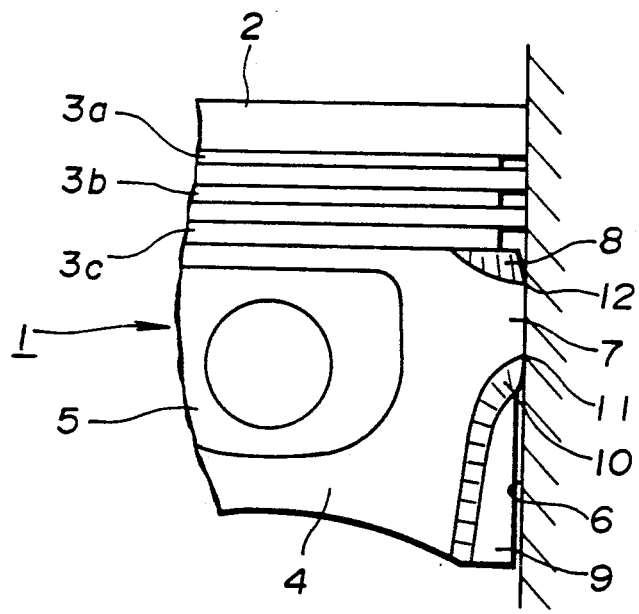
FIG. 15 is a side elevation of the prior art piston shown in FIG. 14.

FIG. 13 shows a seventh embodiment of the present invention. In this arrangement two essentially mirror image inverted U-shaped recesses 728 are formed in a symmetrical configuration on the lower portion of the skirt 24. As shown, the lower ends of the recesses open onto the lower edge 24a of the skirt 24.

It should be noted that the 4th to 7th embodiments described above are such that the boundaries of the recess or recesses are formed with rounded "barrel-like" boundary portions which permit the oil, which is collected in the recess or recesses, to flow out onto the peripheral surfaces adjacent the same.

What is claimed is:

1. A piston comprising:
    a head portion;
    a thrust surface;
    a skirt portion which extends downwardly from the thrust surface;
    a shallow recess formed in the skirt portion in which oil can be collected during reciprocation of the piston in a cylinder bore; and
    means defining a rounded surface at the boundary defined between the recess and the surface in which the recess is formed, for smoothly merging the recess with the surface in which the recess is formed, for eliminating the formation of discrete edges and for permitting oil in the recess to readily flow onto the thrust surface.

2. A piston comprising:
    a thrust surface;
    a skirt;

means defining a recess in the skirt in which oil can be collected during reciprocation of the piston in a cylinder bore; and surface means which extend along a boundary defined between the recess and the surface in which the recess is formed, said surface means smoothly merging the recess and the surface in which the recess is formed, eliminating discrete edges, and permitting oil to flow from the recess onto the thrust surface.

3. A piston as claimed in claim 2 wherein said skirt has a lower edge and wherein said recess extends all the way to the lower edge.

4. A piston as claimed in claim 3 wherein the portion of the recess formed at the lower edge of said skirt is curved inwardly so as to facilitate the collection of oil in the recess.

5. A piston as claimed in claim 1 further comprising means defining a second recess in the skirt and second surface means which extends along a boundary defined between the second recess and the surface in which the second recess is formed, said second surface means smoothly merging the second recess and the surface in which the second recess is formed, eliminating discrete edges and permitting oil to flow from the second recess onto the thrust surface.

6. A piston as claimed in claim 1 wherein said recess extends from a lower edge of said skirt to a level proximate the head portion of the piston.

* * * * *